(12) United States Patent
Judd et al.

(10) Patent No.: US 10,351,266 B2
(45) Date of Patent: Jul. 16, 2019

(54) ATTITUDE DETERMINATION AND CONTROL SYSTEM (ADCS), SUN SENSOR, AND STAR TRACKER

(71) Applicant: Triad National Security, LLC, Los Alamos, NM (US)

(72) Inventors: Stephen Judd, Los Alamos, NM (US); Nicholas Dallmann, Los Alamos, NM (US); Michael Proicou, Los Alamos, NM (US); Daniel Seitz, Los Alamos, NM (US); Paul Stein, Los Alamos, NM (US); John Martinez, Los Alamos, NM (US); Gayle Kestell, Los Alamos, NM (US); Adam Warniment, Santa Fe, NM (US); Steven Storms, Los Alamos, NM (US)

(73) Assignee: Triad National Security, LLC, Los Alamos, NM (US)

( * ) Notice: Subject to any disclaimer, the term of this patent is extended or adjusted under 35 U.S.C. 154(b) by 658 days.

(21) Appl. No.: 14/745,875

(22) Filed: Jun. 22, 2015

(65) Prior Publication Data

US 2015/0367966 A1  Dec. 24, 2015

Related U.S. Application Data

(60) Provisional application No. 62/016,557, filed on Jun. 24, 2014.

(51) Int. Cl.
*B64G 1/36* (2006.01)
*B64G 1/28* (2006.01)
*G05D 1/08* (2006.01)

(52) U.S. Cl.
CPC ............. *B64G 1/363* (2013.01); *B64G 1/283* (2013.01); *B64G 1/361* (2013.01); *G05D 1/0883* (2013.01)

(58) Field of Classification Search
None
See application file for complete search history.

(56) References Cited

U.S. PATENT DOCUMENTS

| | | | | |
|---|---|---|---|---|
| 4,230,294 A | * | 10/1980 | Pistiner | B64G 1/285 244/165 |
| 4,425,813 A | * | 1/1984 | Wadensten | F16F 15/124 248/635 |

(Continued)

OTHER PUBLICATIONS

G. Smet, et al, 2013, Managing reaction wheel microvibration on a high resolution EO small spacecraft, European Space Mechanisms & Tribology Symposium, ESTEC, Noordwijk, The Netherlands.*

(Continued)

*Primary Examiner* — Todd M Melton
*Assistant Examiner* — Jason R Roberson
(74) *Attorney, Agent, or Firm* — LeonardPatel PC; Michael Aristo Leonard II; Sheetal Suresh Patel

(57) ABSTRACT

An ADCS module may be configured to use coordinate data from 2D photodiodes in one or more sun sensors to determine a sun vector. The ADCS module may then use the sun vector in reference to its own body faced (BF) coordinate system to calculate a change in the orientation of the space vehicle. The change in orientation mechanism may be accomplished by reaction wheels, ion thrusters, or other orientation altering mechanisms. A miniature, intelligent star tracker may be included that improves satellite attitude determination and pointing accuracy. An improved reaction wheel assembly may be included that is more robust and suitable for inclusion in small space vehicles.

9 Claims, 11 Drawing Sheets

(56) References Cited

U.S. PATENT DOCUMENTS 4,740,680 A * 4/1988 Frisch .................. G01S 5/163
244/3.18
5,698,842 A * 12/1997 Fallon .................. B64G 1/281
244/3.16

OTHER PUBLICATIONS

AST internet article "Bearings and Related Products & Services" available at https://www.astbearings.com/pillow-blocks-flanges.html (Year: 2012).*
Space Micro MSS-01,02 Medium Sun Sensors Brochure, http://www.spacemicro.com/assets/datasheets/guidance-and-nav/MSS.pdf (May 2, 2014).
ESTCube-1 Wikipedia Page, https://en.wikipedia.org/wiki/ESTCube-1 (last accessed Apr. 24, 2014).

* cited by examiner

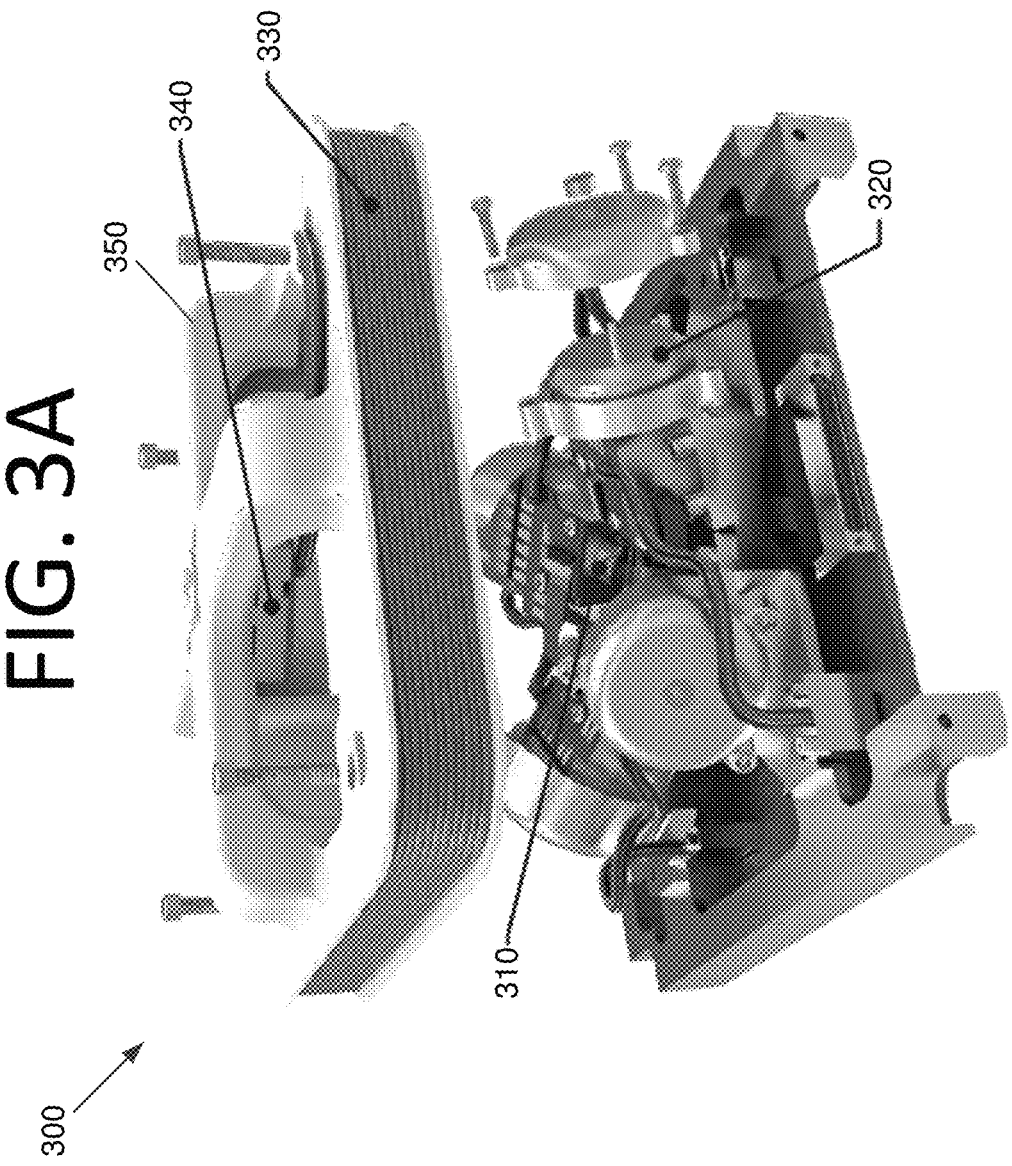

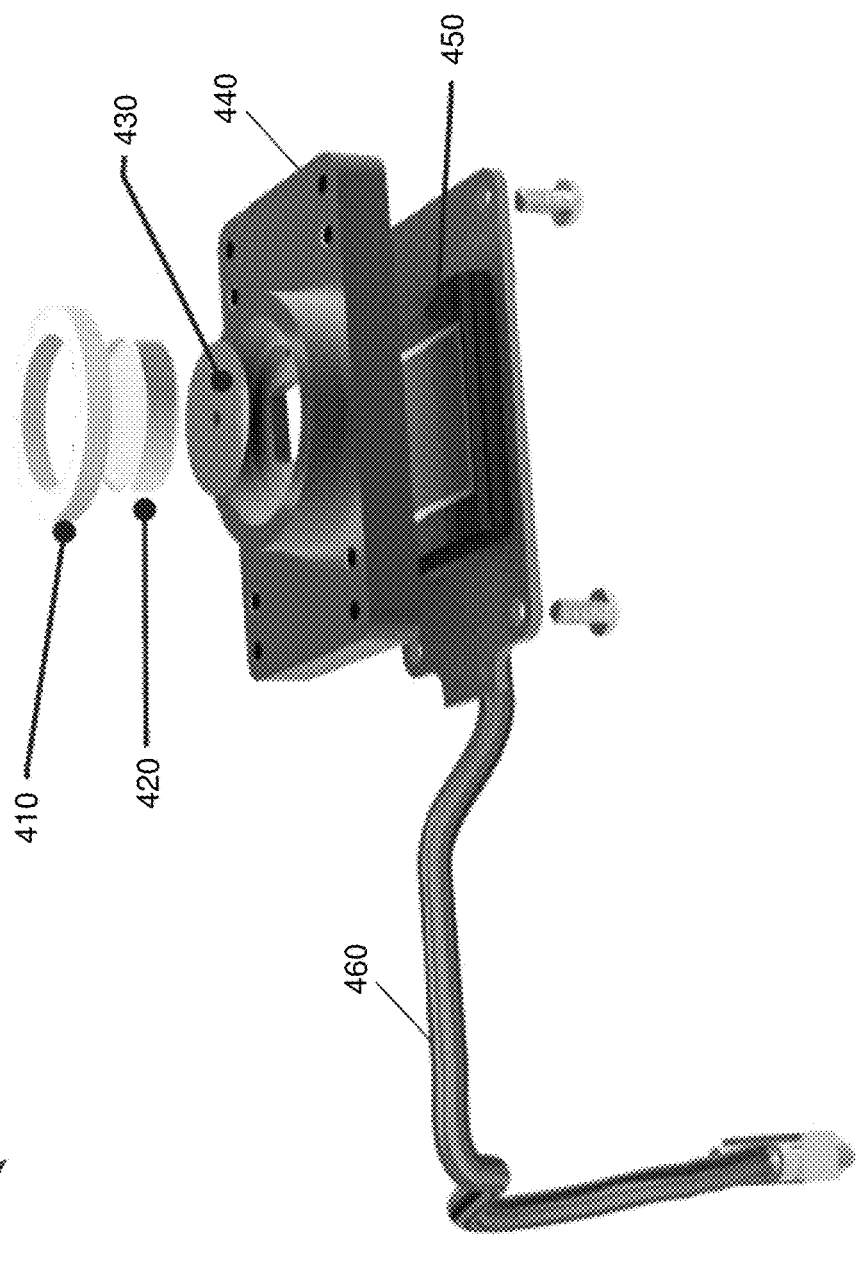

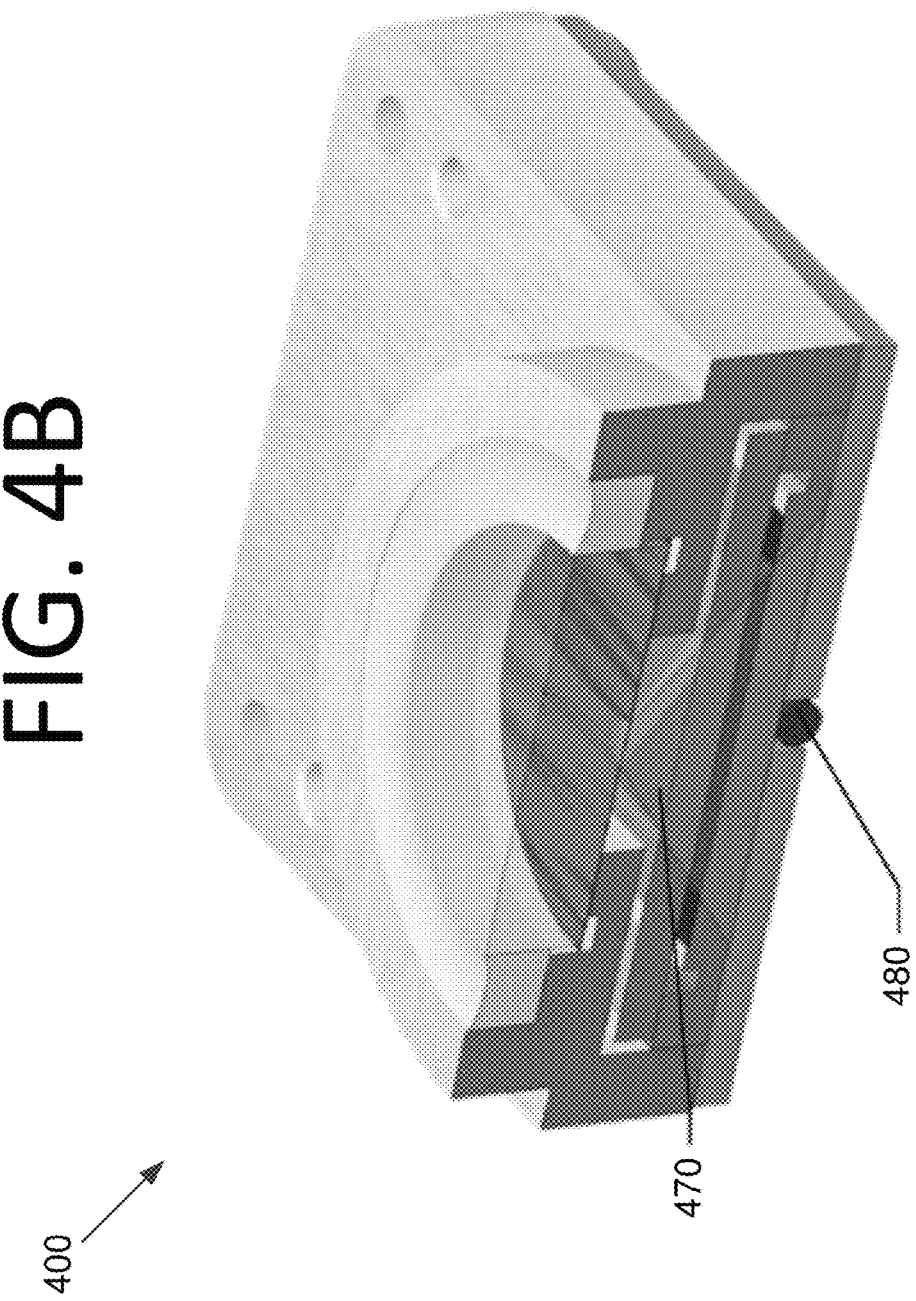

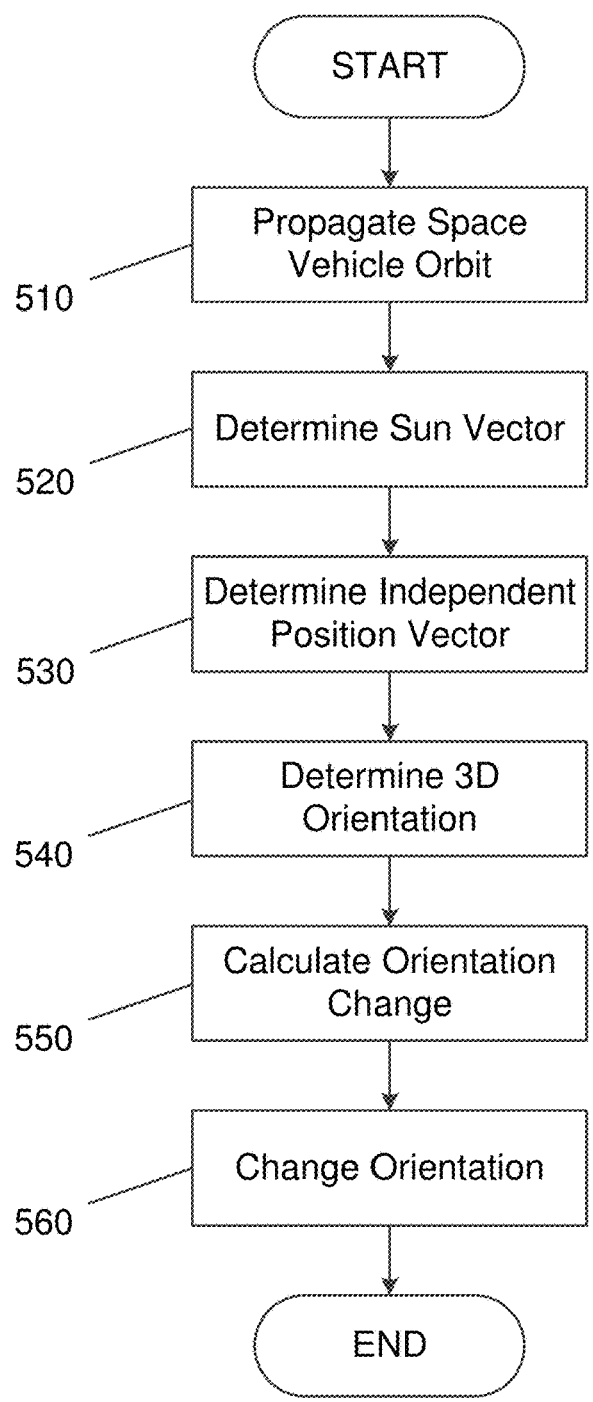

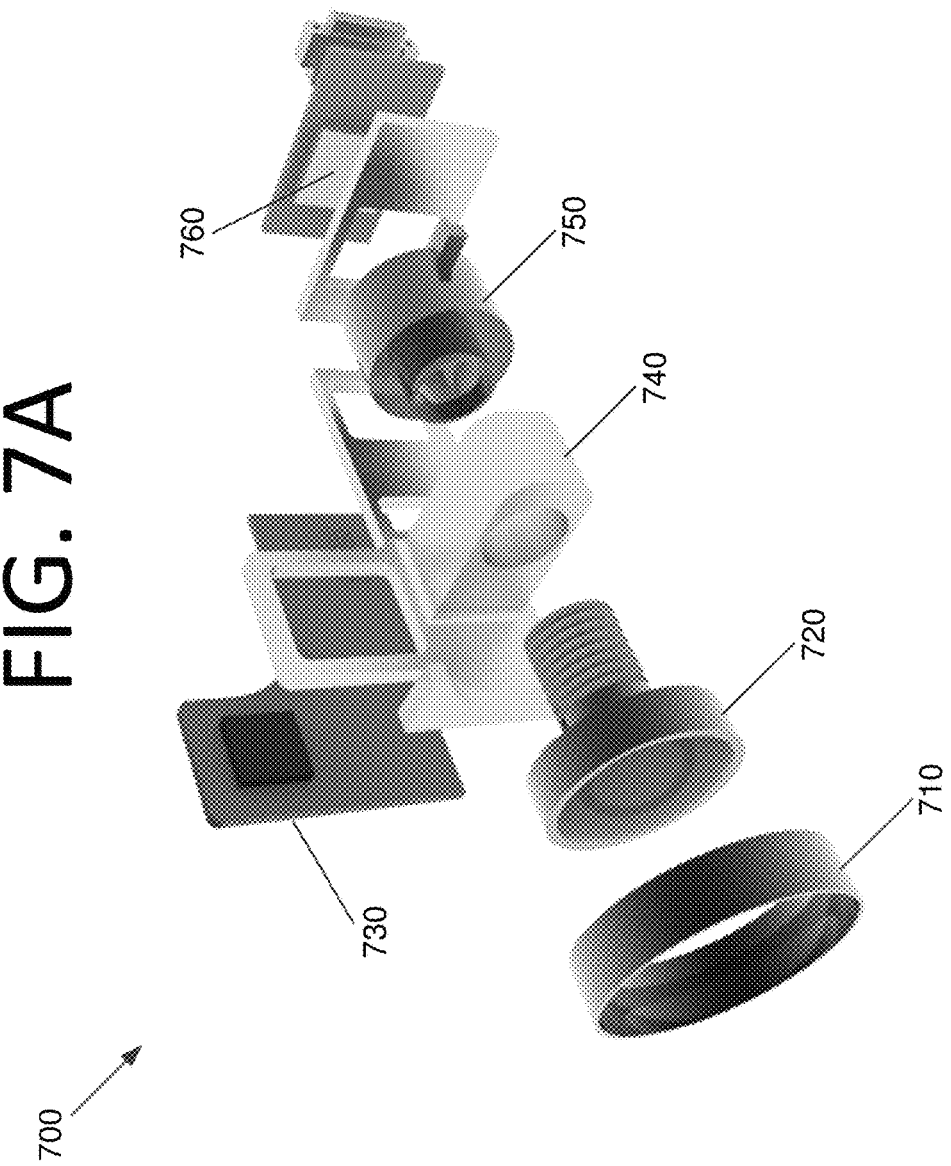

ATTITUDE DETERMINATION AND CONTROL SYSTEM (ADCS), SUN SENSOR, AND STAR TRACKER

CROSS REFERENCE TO RELATED APPLICATION

This application claims the benefit of U.S. provisional patent application No. 62/016,557 filed on Jun. 24, 2014. The subject matter of this earlier filed application is hereby incorporated by reference in its entirety.

STATEMENT OF FEDERAL RIGHTS

The United States government has rights in this invention pursuant to Contract No. DE-AC52-06NA25396 between the United States Department of Energy and Los Alamos National Security, LLC for the operation of Los Alamos National Laboratory.

FIELD

The present invention generally relates to space vehicles, and more particularly, to a space vehicle attitude determination and control system (ADCS) that may have an improved wheel bearing design, incorporate at least one two-dimensional (2D) photodiode sun sensor, incorporate a star tracker, or any combination thereof.

BACKGROUND

In conventional space vehicles, attitude determination and control (ADCS) systems may use sun sensors having one or more photodiodes. These sun sensors consume more volume than is desirable for relatively small space vehicles, such a cubesats, and are expensive, making them less than optimal for small space vehicles.

In conventional space vehicles, ADCS systems may use star trackers consisting of either a standalone camera or a camera with processing electronics. Traditional star trackers are relatively large, have high power consumption, can require significant volume for the processing electronics, and are expensive. Miniaturized versions of these sensors also tend to have significant power and volume requirements, as well as high cost. In some cases, the star tracker is a standalone camera that requires satellite resources for processing.

Reaction wheels in ADCS systems for small cubesats and other small space vehicles pose several significant design challenges. In general, a small motor must be used due to the size and power restrictions on smaller cubesats, but the reaction wheels must be relatively large and heavy to provide a sufficient moment of inertia to control the satellite. Mounting the reaction wheels directly to the motor drive shaft results in very high stresses during random vibration testing, leading to damage or destruction of the assembly. Because the wheel is spun at high rotation rates, high precision in fabrication and assembly is required. Any misalignments or wheel imbalances will typically cause the assembly to fail rapidly. Accordingly, improved ADCS systems, including sun sensors, star trackers, and reaction wheel assemblies, may be beneficial.

SUMMARY

Certain embodiments of the present invention may provide solutions to the problems and needs in the art that have not yet been fully identified, appreciated, or solved by conventional space vehicle ADCS systems. For example, some embodiments use one or more sun sensors employing 2D photodiodes and pinhole cameras to provide (x, y) coordinate data and determine the position of the sun to a high degree of accuracy. Some embodiments include a miniature, intelligent star tracker to improve satellite attitude determination and pointing accuracy. Certain embodiments include an improved reaction wheel assembly that is more robust and suitable for inclusion in small space vehicles.

In an embodiment, an attitude determination and control system (ADCS) includes an ADCS module. The ADCS also includes a reaction wheel and motor assembly configured to be operated by the ADCS module. The ADCS module includes a wheel assembly and a motor assembly that are connected to one another via pliable rivets.

In another embodiment, an apparatus includes a pinhole aperture. The apparatus also includes a sensor including a two-dimensional (2D) photodiode configured to receive light from the pinhole aperture. The sensor is configured to determine coordinates for the sun from the 2D photodiode.

In yet another embodiment, a star tracker includes a processor board configured to determine an attitude of a space vehicle at a star tracker sensor.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which:

FIG. 3A is a perspective view illustrating an opened ADCS module, according to an embodiment of the present invention.

FIG. 4A is an exploded perspective view illustrating a sun sensor, according to an embodiment of the present invention.

FIG. 4B is a cutaway perspective view illustrating the sun sensor, according to an embodiment of the present invention.

FIG. 5 is a flowchart illustrating a process for calculating position and controlling orientation of a space vehicle, according to an embodiment of the present invention.

FIG. 7A is an exploded view illustrating a tracker, according to an embodiment of the present invention.

DETAILED DESCRIPTION OF THE EMBODIMENTS

Some embodiments of the present invention pertain to an ADCS module that is configured to use coordinate data from 2D photodiodes in one or more sun sensors to determine a sun vector. The ADCS module may then use the sun vector in reference to its own body fixed (BF) coordinate system, combined with vectors from a second sensor (e.g., star, magnetic field, horizon, etc.), to calculate a change in the orientation of the space vehicle. The change in orientation mechanism may be accomplished by reaction wheels, ion thrusters, other orientation altering mechanisms, or any combination thereof in some embodiments. Some embodiments include a miniature, intelligent star tracker to improve satellite attitude determination and pointing accuracy. Certain embodiments include an improved reaction wheel assembly that is more robust and suitable for inclusion in small space vehicles.

Figure 1:
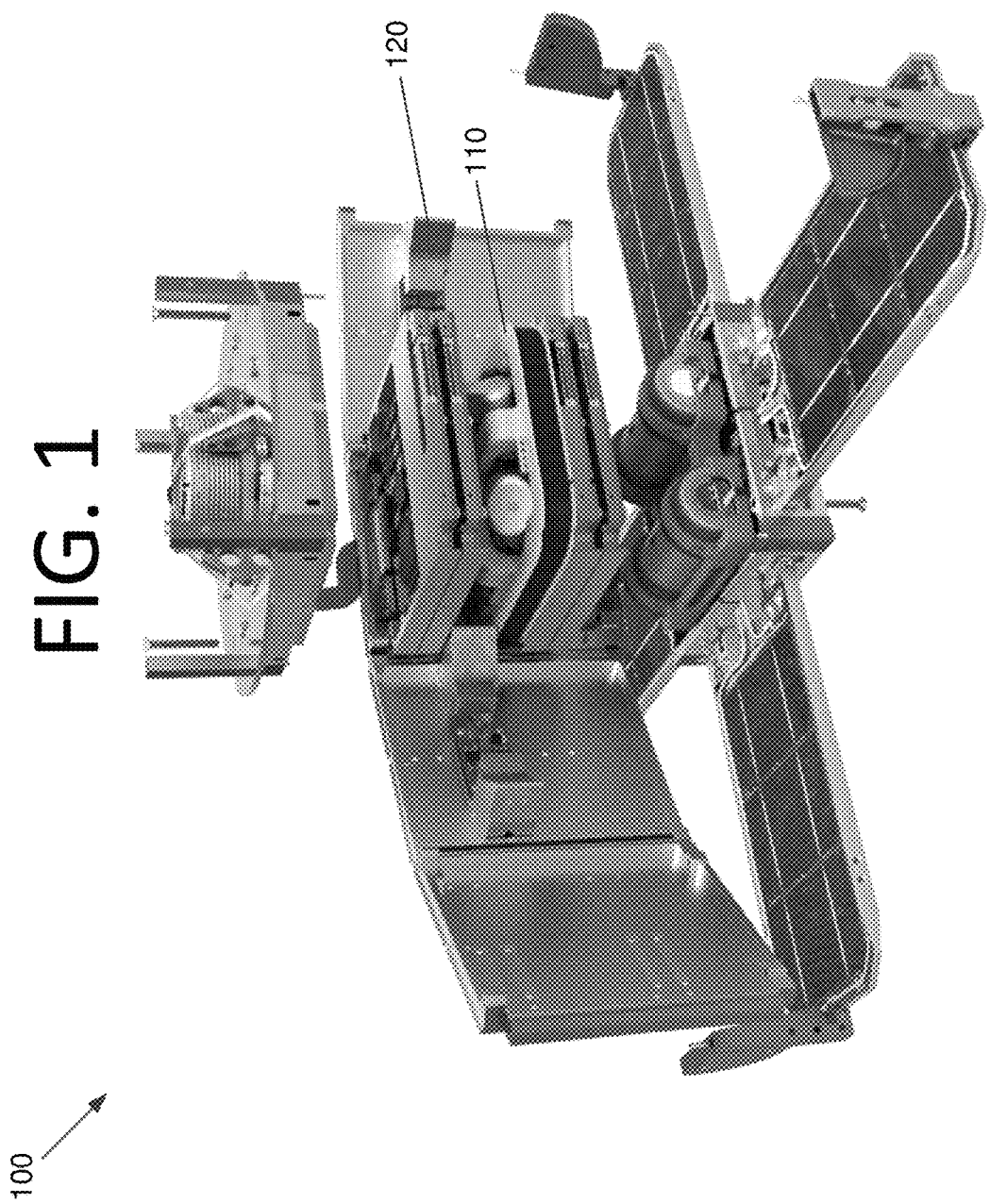
FIG. 1 is an exploded perspective view illustrating a cubesat with an opened chassis, according to an embodiment of the present invention.

FIG. 1 is an exploded perspective view illustrating a cubesat 100 with an opened chassis, according to an embodiment of the present invention. Cubesat 100 includes an ADCS module 110 configured to receive positioning data from multiple sensors, including a sun sensor 120. In some embodiments, multiple sun sensors may be used to track the sun when it is on different sides of cubesat 100, depending on its orientation.

In some embodiments, the role of the ADCS is to determine space vehicle position and orientation, point the space vehicle at specific areas at specific times based on mission requirements, and/or to track objects (track ground objects, point solar panels at the sun, etc.). Position determination may be accomplished using orbit propagators (e.g., orbit propagation model SGP4) and orientation determination may be accomplished using onboard sensors. For instance, a magnetometer may determine the Earth's magnetic field, which may be compared with a field model (e.g., implementing World Magnetic Field Model 2010). The magnetometer may provide a vector measurement (x, y, z) of the local magnetic field in a BF coordinate system.

One or more sun sensors may determine the sun vector, which may be compared to a sun model. The sun vector may be provided in the BF coordinate system when the sun is in view of one of the sun sensors. A microelectromechanical system (MEMS) gyro may be used when the sun is not in view of a sun sensor to provide angular rate information for tracking the change in orientation of the space vehicle.

Pointing/tracking may be accomplished using reaction wheels, movable masses, ion thrusters, or any other desired position altering mechanism. In some embodiments, four motors drive respective space-compatible reaction wheels. A torque coil may be used to bleed momentum. The ADCS may be configured to automatically determine when targets are in view and perform pointing in some embodiments.

The ADCS may employ various coordinate systems. For instance, an Earth centered Earth fixed coordinate system (ECEF) that is the same as the World Geodetic System (WGS84) may be used. In this system, the +z-axis is aligned with the geographic North Pole, the +x-axis is aligned where the Equator and the Prime Meridian cross (i.e., zero longitude), and the y-axis is orthogonal to the x-axis and z-axis, completing the ECEF coordinate system.

Figure 2:
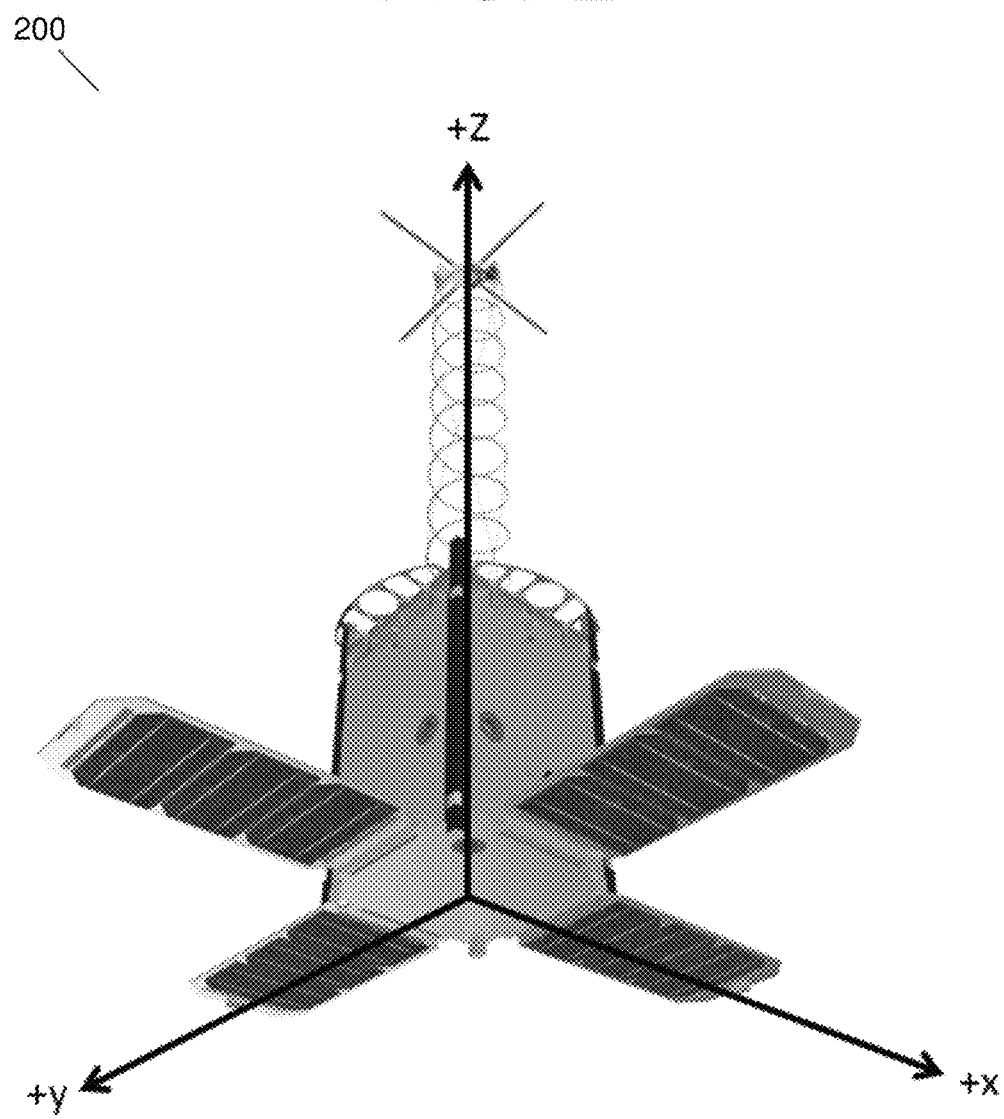
FIG. 2 is a perspective view illustrating a BF coordinate system with reference to a cubesat.

Some embodiments may employ a local coordinate system in addition to or in lieu of the ECEF coordinate system. Such a coordinate system is shown with respect to a cubesat 200 in FIG. 2. In the body faced (BF) coordinate system of FIG. 4, the +z-axis is aligned with the high gain antenna, the +x-axis is normal to the side surface aligned with one of the sun sensors, and the y-axis is orthogonal to the x-axis and z-axis, completing the coordinate system. Attitude may be determined by a coordinate system transformation matrix that aligns the BF coordinate system with the ECEF coordinate system. While FIG. 2 is designated as "Related Art," this refers to the coordinate system only. Other aspects of the depicted cubesat are novel.

FIG. 3A is a perspective view illustrating an opened ADCS module 300, according to an embodiment of the present invention. Brushless electric motors 310 drive respective reaction wheels 320. In this embodiment, four reaction wheels 320 provide three-axis control. However, different numbers of reaction wheels may be used in other embodiments as a matter of design choice, accounting for their position and mass to control orientation. Each of reaction wheels 320 may be spun up or spun down to save power without changing space vehicle roll. Full three-axis control requires only three motors to operate. Thus, the four-axis configuration provides additional torque and redundancy.

In this embodiment, a single torque coil 330 has a magnetic moment acting about the z-axis. For example, in some embodiments, torque coil 330 may have approximately 200 turns of 24 American wire gauge (AWG) magnetic wire. A gyro, gyro PCB, and heat sink 340 provide gyro functionality and heat dissipation for ADCS 300. A frame 350 accommodates torque coil 330, as well as gyro, gyro PCB, and heat sink 340. In certain embodiments, frame 350 may be created using an additive machining process. The main ADCS PCB, sun sensor PCBs, and motor interface PCB are not shown in this view.

Figure 3B:
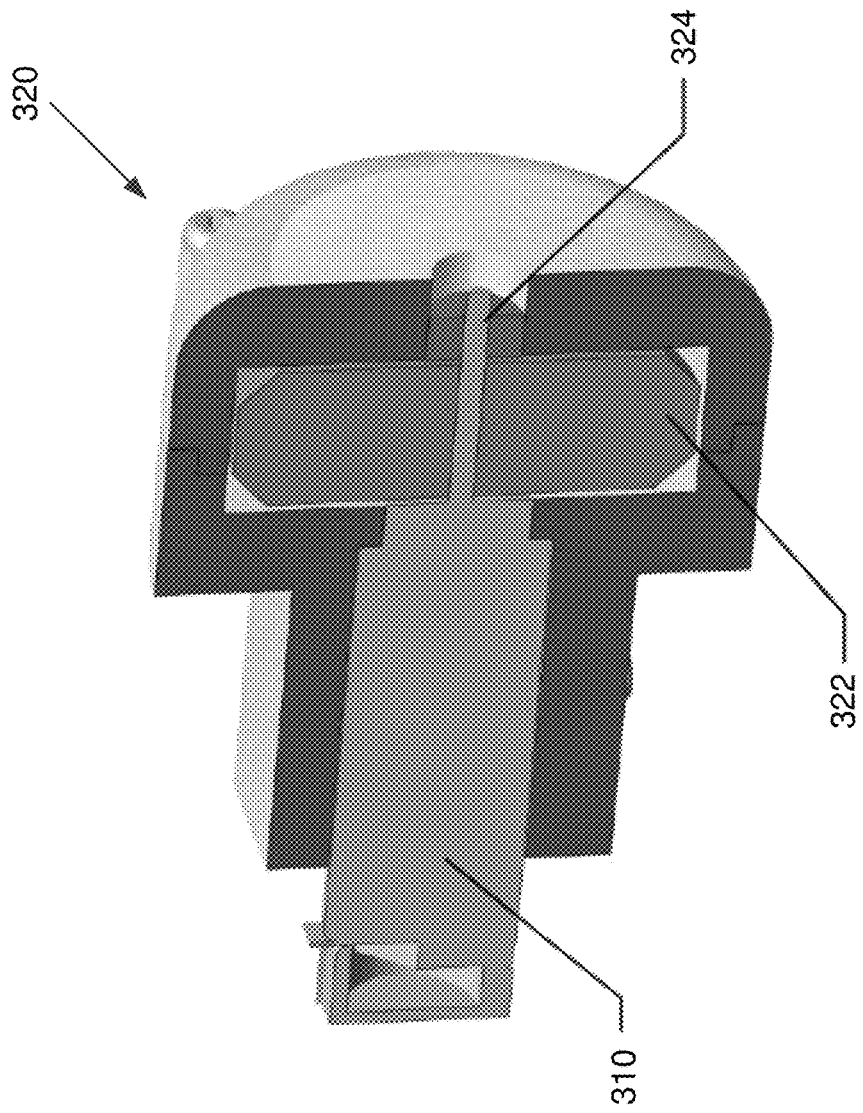
FIG. 3B is a cutaway perspective view illustrating the inside of the reaction wheel of FIG. 3A.

FIG. 3B is a cutaway perspective view illustrating the inside of reaction wheel 320 of FIG. 3A. Reaction wheel 320 includes a reaction wheel 322 held in place by a support bearing 324 that, when combined with the surrounding housing, provides a high degree of immunity to mechanical shock and vibration. Brushless motor 310 drives the rotation of reaction wheel 322.

FIG. 4A is an exploded perspective view illustrating a sun sensor 400, according to an embodiment of the present invention. Unlike conventional sun sensors, which use quad-pack diodes, sun sensor 400 uses a pinhole camera and a 2D position-sensitive photodiode sensor 450 to sense the position of the sun. Epoxy affixes ring 410 to a glass window 420 covering a pinhole aperture 430 and to a frame 440. Light from the sun passes through glass window 420, then through pinhole aperture 430, and contacts a 2D position sensitive photodiode of sensor 450.

Sensor 450 determines a 2D position based on the solar position via cable 460. This position information, in the form of (x, y) coordinates, may be relayed to an ADCS either directly or via a backplane. Such a design provides for a compact and low cost sun sensor that may be the size of a penny or smaller in some embodiments.

Only a single sun sensor is needed to get angle to the sun in some embodiments. However, the sun sensor must be oriented so as to receive sunlight. Accordingly, some embodiments employ multiple sun sensors on different sides of the space vehicle in order to maintain view of the sun in various orientations. The sun need not be in view all the time, but it must be in view for detection by a given sun sensor.

FIG. 4B is a cutaway perspective view illustrating sun sensor 400, according to an embodiment of the present invention. A cone field of view 470 is provided on the photodiode of sensor 450. Light from the sun enters via pinhole aperture 430, contacting the 2D photodiode of sensor 450 at a location within cone field of view 470, depending on the position of the sun, converting light into current. A thermistor 480 is used to control for temperature-dependent variations of the photodiode response.

FIG. 5 is a flowchart illustrating a process 500 for calculating position and controlling orientation of a space vehicle, according to an embodiment of the present invention. The process begins with propagating the space vehicle orbit, via an orbit propagator of the ADCS, to determine space vehicle position at 510. Next, 2D position coordinates for the sun are detected at 520 via a sun sensor using a 2D photodiode and a sun vector is determined by the ADCS. The 2D position coordinates provide a vector to the sun with respect to the sun sensor direction. An independent position vector, such as a star vector, magnetic field vector, or horizon vector, is determined at 530.

The ADCS compares these vectors with the expected vectors determined from the orbit propagator and internal models to determine the three-dimensional space vehicle orientation at 540. The ADCS then calculates a change in orientation needed to orient the space vehicle in the desired orientation at 550. Finally, the space vehicle spins up the appropriate reaction wheels at the appropriate speeds for the appropriate amount of time to accomplish the orientation change at 560.

Per the above, reaction wheels for small cubesats and other relatively small space vehicles pose several significant design challenges. Accordingly, some embodiments, such as that depicted in FIG. 6 and discussed in further detail below, include an improved reaction wheel design that provides superior performance in small space vehicles. However, such reaction wheels may be provided in space vehicles of any size as a matter of design choice.

Instead of mounting the wheel directly to the motor shaft, as shown in FIG. 3B, for example, the wheel may be mounted to a separate assembly, including a large and robust shaft, bearing, and mounting block. The motor may be mounted to a small drive wheel, and the small drive wheel may be coupled to the relatively large reaction wheel via an innovative pair of silicone "rubber rivets." However, any suitably pliable rivet material may be used as a matter of design choice. Using this scheme, the motor and motor shaft do not experience large mechanical stresses during vibration. Moreover, whereas rigid coupling assemblies require extremely high precision alignment and are subject to misalignment due to physical effects such as thermal expansion, the rubber rivets absorb small misalignments.

Another effect is due to the pulsed nature of a typical electric motor. Instead of a smooth, steady drive, the wheel is actually driven by a set of rapid motor pulses, which can lead to very high shear stresses and early failure of rigid coupling mechanisms such as metal pins. The use of the flexible rivets eliminates this failure mechanism, while providing very smooth and reliable wheel operation. Finally, it should be noted that separating the wheel and motor assemblies may allow any suitable motor to be used with the wheel assembly.

Figure 6:
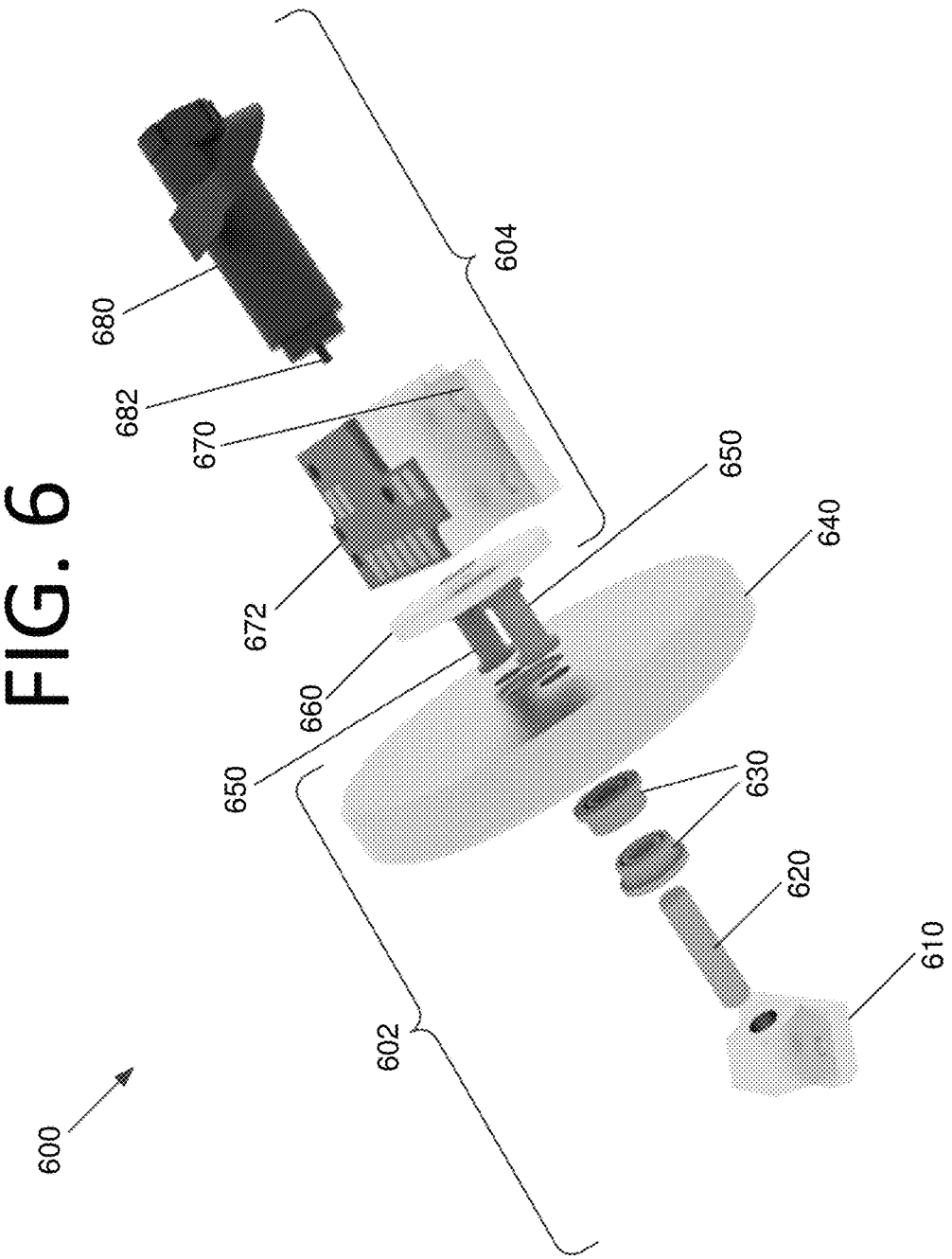
FIG. 6 is an exploded view illustrating a reaction wheel and motor assembly, according to an embodiment of the present invention.

FIG. 6 is an exploded view illustrating a reaction wheel and motor assembly 600, according to an embodiment of the present invention. The assembly consists of two primary subassemblies: a wheel assembly 602 (including a wheel shaft housing 610, a wheel shaft 620, a pair of flanged precision bearings 630, and a reaction wheel 640) and a motor assembly 604 (including a drive wheel 660, a motor housing 670, and a motor 680). Reaction wheel 640 is mounted to flanged precision bearings 630. However, any number or type of bearings may be used as a matter of design choice. Using flanged precision bearings 630 ensures that reaction wheel 640 is properly seated and provides proper pre-loading on flanged precision bearings 630 to reduce or eliminate wobble and excess friction. Flanged precision bearings 630 are mounted to wheel shaft 620, which is in turn mounted to wheel shaft housing 610. Wheel shaft 620 may be sufficiently large to survive harsh vibration loads, such as NASA General Environmental Verification Standard (GEVS) or higher.

Resulting wheel assembly 602 is very robust due to the use of relatively large wheel shaft 620 and wheel shaft housing 610, enabling wheel assembly 602 to survive very harsh mechanical stresses. Motor assembly 604 includes motor 680, which is mounted to motor housing 670, and drive wheel 660 mounted directly to a drive shaft 682 of motor 680. Wheel assembly 602 and motor assembly 604 may be finally connected using silicone "rubber rivets" 650, which couple drive wheel 660 to reaction wheel 640. However, any other suitable shock absorbing material may be used without deviating from the scope of the invention.

Resulting reaction wheel and motor assembly 600 is very robust. Robust wheel shaft 620 bears the load of reaction wheel 640, instead of relatively small and fragile motor drive shaft 682. Because wheel assembly 602 is separate from motor assembly 604, any suitable motor may be used to drive reaction wheel 640, and much larger wheels may be used without deviating from the scope of the invention. Rubber rivets 650 are a particularly important innovation in this embodiment, as they allow motor assembly 604 to be coupled to wheel assembly 602 without precision alignment. Moreover, whereas rigid attachment mechanisms such as pins result in high mechanical stresses and early system failure, pliable rubber rivets 650 absorb the shock of the pulsed motor drive, providing smooth, reliable operation of reaction wheel 640.

Motor housing 670 also contains a small interface board 672 that interfaces motor 680 to the main ADCS board (not shown). Whereas motor 680 has a relatively flimsy ZIF connector 684 that allows very few mate/de-mate cycles, this connector may be rigidly attached to circuit board 672 and a more robust cable (not shown) may be run to the ADCS board. This ensures high reliability during random vibration testing and greatly simplifies assembly, allowing multiple mate/de-mate cycles and reducing cost and failure risk.

Figure 7B:
FIG. 7B is a perspective view illustrating the assembled star tracker, according to an embodiment of the present invention.
Figure 7C:
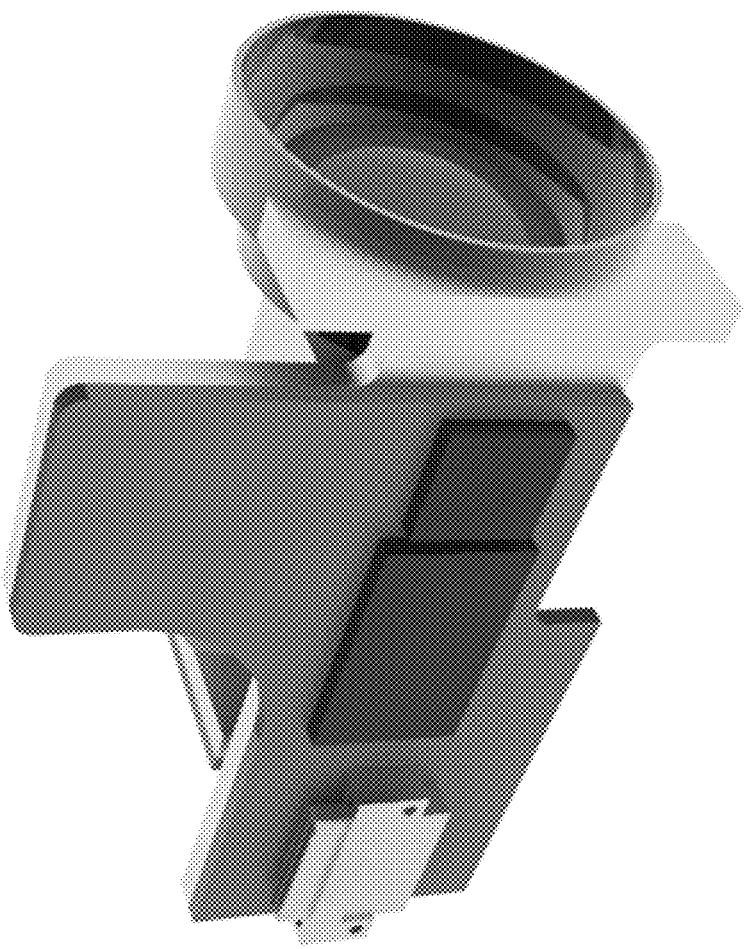
FIG. 7C is another perspective view illustrating the assembled star tracker, according to an embodiment of the present invention.

Per the above, some embodiments include a star tracker to improve satellite attitude determination and pointing accuracy. An embodiment of such a miniature, intelligent star tracker is shown in FIGS. 7A-C. The star tracker may include a camera (lens and sensor) and a processing board, both integrated into a small package. The processing board may enable star field images to be processed locally at the sensor, instead of by the satellite ADCS board. This greatly reduces the amount of data that needs to be transmitted from the sensor to the ADCS board, compared to a standalone camera. The resulting sensor is low power, very compact, and independent of the ADCS board, enabling integration with any space vehicle in some embodiments.

FIG. 7A is an exploded view illustrating a tracker 700, according to an embodiment of the present invention. A camera lens 710, lens assembly 720, baffle 750, and detector 760 form an optical assembly, all attached to mount 740. A processor board 730 contains an FPGA and microprocessor in this embodiment. However, any suitable processing technology may be used. As a result, star tracker 700 is compact, intelligent, and low power. Instead of having the space vehicle take and process star field images, processor board 730 processes images at star tracker 700. Star tracker 700 takes the images and runs a standard star field search algorithm in this embodiment to determine the attitude of the space vehicle. As a result, only a small amount of information needs to be communicated with the space vehicle ADCS system, and star tracker 700 may be integrated into any space vehicle in some embodiments. Because low power processors and sensors are used, the overall power consumption is very low. Camera lens 710 is relatively large in this embodiment and detector 760 is high resolution, enabling high accuracy attitude determination. Perspective views of assembled star tracker 700 are shown in FIGS. 7B and 7C.

It will be readily understood that the components of various embodiments of the present invention, as generally described and illustrated in the figures herein, may be arranged and designed in a wide variety of different configurations. Thus, the detailed description of the embodiments of the present invention, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. An attitude determination and control system (ADCS), comprising:
   an ADCS module comprising a reaction wheel and motor assembly configured to be operated by the ADCS module, wherein
   the reaction wheel and motor assembly comprises a wheel assembly and a motor assembly that are separate from one another and connected to one another via silicone rubber rivets, the wheel assembly comprising a reaction wheel and the motor assembly comprising a drive wheel, the reaction wheel directly connected to the drive wheel via the silicone rubber rivets, and
   the ADCS is a component of a space vehicle.

2. The ADCS of claim 1, wherein the wheel assembly comprises:
   a wheel shaft housing;
   a wheel shaft mounted to the wheel shaft housing;
   a plurality of flanged precision bearings mounted to the wheel shaft; and
   a reaction wheel mounted to the plurality of flanged precision bearings.

3. The ADCS of claim 1, wherein the motor assembly comprises:
   a motor housing;
   a motor comprising a drive shaft, the motor mounted to the motor housing; and
   a drive wheel mounted directly to the drive shaft of the motor.

4. The ADCS of claim 1, wherein the motor assembly comprises a motor housing, the motor housing comprising an interface board that interfaces with the ADCS.

5. The ADCS of claim 1, further comprising:
   a sun sensor comprising a pinhole aperture and a two-dimensional (2D) photodiode, the sun sensor configured to provide coordinates of a position of the sun to the ADCS module.

6. The ADCS of claim 5, wherein the ADCS module is configured to orient a space vehicle to a new orientation based on the coordinates from the sun sensor and a body frame coordinate system of the ADCS module.

7. The ADCS of claim 6, wherein
   the ADCS system comprises a plurality of sun sensors on different sides of a space vehicle.

8. The ADCS of claim 1, further comprising:
   a star tracker comprising a processor board configured to determine an attitude of a space vehicle at a star tracker sensor.

9. The ADCS system of claim 8, wherein the star tracker further comprises:
   an optical assembly comprising a camera lens, a lens assembly, a baffle, and a detector, wherein
   the optical assembly is attached to a mount.

\* \* \* \* \*